United States Patent
Kamper et al.

(10) Patent No.: US 6,414,674 B1
(45) Date of Patent: Jul. 2, 2002

(54) DATA PROCESSING SYSTEM AND METHOD INCLUDING AN I/O TOUCH PAD HAVING DYNAMICALLY ALTERABLE LOCATION INDICATORS

(75) Inventors: Robert J. Kamper; Michael A. Paolini, both of Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,296

(22) Filed: Dec. 17, 1999

(51) Int. Cl.[7] .................................................. G09G 5/00
(52) U.S. Cl. ........................ 345/173; 345/176; 345/168; 178/18.03; 178/18.11
(58) Field of Search ................................ 345/173, 176, 345/168; 178/18.03, 18.11

(56) References Cited

U.S. PATENT DOCUMENTS

| | | | |
|---|---|---|---|
| 4,447,692 A | * 5/1984 | Mierzwinski | 219/10.55 |
| 5,313,840 A | 5/1994 | Chen et al. | 73/763 |
| 5,317,140 A | 5/1994 | Dunthorn | 250/221 |
| 5,565,733 A | 10/1996 | Krafcik et al. | 313/510 |
| 5,577,848 A | 11/1996 | Bowen | 400/472 |
| 5,589,856 A | * 12/1996 | Stein et al. | 345/173 |
| 5,638,060 A | * 6/1997 | Kataoka et al. | 341/20 |
| 5,703,625 A | * 12/1997 | Snider et al. | 345/168 |
| 5,811,930 A | 9/1998 | Krafcik et al. | 313/510 |
| 5,877,751 A | * 3/1999 | Kanemitsu et al. | 345/173 |
| 5,887,995 A | 3/1999 | Holchan | 400/479.1 |
| 5,917,906 A | 6/1999 | Thornton | 379/433 |
| 6,198,475 B1 | * 3/2001 | Kunimatsu et al. | 345/173 |

* cited by examiner

Primary Examiner—Bipin Shalwala
Assistant Examiner—Jimmy H. Nguyen
(74) Attorney, Agent, or Firm—Marilyn Smith Dawkins; Bracewell & Patterson, L.L.P.

(57) ABSTRACT

A data processing system and method including a touch pad capable of receiving inputs and providing outputs utilizing a surface of the pad. The surface is first enabled to receive inputs utilizing a plurality of input regions specified within the surface of the I/O touch pad. An output is provided utilizing the surface of the touch pad by outputting a first plurality of location indicators for assisting a user to quickly locate at least one of the plurality of input regions. The surface is then enabled to receive inputs utilizing a different plurality of input regions specified within the surface of the I/O touch pad. The output is then dynamically altered in response to the specification of the different plurality of input regions by outputting a second plurality of location indicators for assisting the user to quickly locate at least one of the different plurality of input regions. The output is altered synchronously with the enablement of the surface to receive inputs utilizing the different plurality of input regions.

9 Claims, 4 Drawing Sheets

DATA PROCESSING SYSTEM AND METHOD INCLUDING AN I/O TOUCH PAD HAVING DYNAMICALLY ALTERABLE LOCATION INDICATORS

BACKGROUND OF THE INVENTION

1. Field of the Invention

The present invention relates in general to data processing systems and, in particular, to a data processing system and method including an input/output touch pad having dynamically alterable location indicators. Still more particularly, the present invention relates to a data processing system and method including an input/output touch pad having a dynamically alterable output, such that location indicators used to assist a user to quickly locate input regions are dynamically alterable synchronously with the changing input regions.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect components together. Examples of such personal computer systems are IBM's PC 300 series, Aptiva series, and Intellistation series.

Interacting with these computer systems can be accomplished utilizing an input touch pad. This interacting, however, can be difficult because these touch pads do not provide an output. Specifically, they do not provide an indication of what part of the input surface of the touch pad maps to a particular area of the display screen.

One known method used to overcome this difficulty is to provide a painted grid on the surface of the input touch pad. In this manner, the user may calibrate the input surface of the touch pad to the display screen utilizing calibration software. This method is time consuming. In addition, when a user desires to zoom in to a portion of the display screen, this method is ineffective because the grid is no longer calibrated to the current output of the display screen.

Therefore a need exists for a data processing system and method including an input/output touch pad capable of providing a dynamically alterable output, such that location indicators are provided to assist a user to quickly locate input regions where the location indicators are dynamically alterable synchronously with the changing input regions.

SUMMARY OF THE INVENTION

A data processing system and method including a touch pad capable of receiving inputs and providing outputs utilizing a surface of the pad. The surface is first enabled to receive inputs utilizing a plurality of input regions specified within the surface of the I/O touch pad. An output is provided utilizing the surface of the touch pad by outputting a first plurality of location indicators for assisting a user to quickly locate at least one of the plurality of input regions. The surface is then enabled to receive inputs utilizing a different plurality of input regions specified within the surface of the I/O touch pad. The output is then dynamically altered in response to the specification of the different plurality of input regions by outputting a second plurality of location indicators for assisting the user to quickly locate at least one of the different plurality of input regions. The output is altered synchronously with the enablement of the surface to receive inputs utilizing the different plurality of input regions.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a method and system including a touch pad capable of receiving inputs and generating dynamically alterable location indicators. The touch pad includes a surface which is first enabled to receive inputs utilizing a plurality of input regions. The input regions are associated with different types of inputs the touch pad is current enabled to receive. For example, the touch pad may be utilized as an input device for a computer, a compact disk player, a radio, or any other device capable of receiving electronic inputs.

If the touch pad is to be utilized as an input device for a computer system, for example, the surface of the touch pad will be enabled to receive inputs which correspond to current input regions displayed on the computer's display screen. If the display screen is currently depicting three different input regions, such as a "close window" region, a "minimize window" region, and an input region within the active window, the surface of the touch pad will be enabled to receive inputs utilizing three input regions. Each of the three input regions enabled on the surface of the touch pad will correspond to one of the input regions depicted on the display screen.

A plurality of location indicators will be output by the touch pad. Each location indicator is utilized to assist a user to quickly location one of the input regions. For example, each location indicator may illuminate an area of the surface of the touch pad which corresponds to one of the input regions.

As the input regions depicted by the display screen change, the surface of the touch pad will be enabled to receive inputs utilizing different input regions. The location indicators output utilizing the surface will also change to assist a user to locate the currently enabled input regions.

Each location indicator may be implemented utilizing a visual element and/or a tactile element. The visual element may be a light-emitting element, and the tactile element may be a heat producing element.

Figure 1:
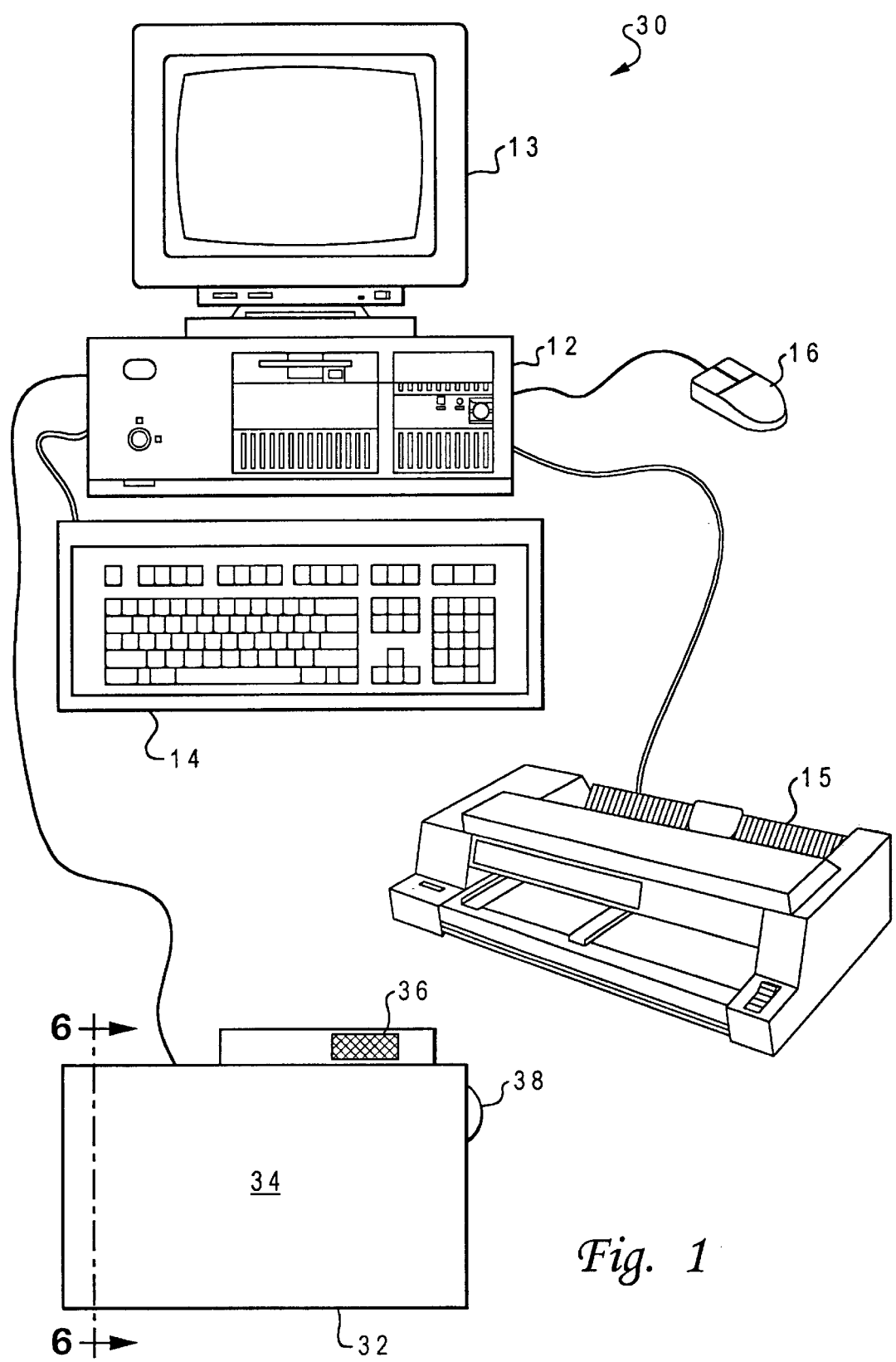
FIG. 1 illustrates a pictorial representation of a data processing system including an input/output touch pad in accordance with the method and system of the present invention.

FIG. 1 illustrates a pictorial representation of a data processing system 30 including an input/output touch pad 32 in accordance with the method and system of the present invention. Computer system 30 includes a computer 12, a monitor 13, a keyboard 14, a mouse 16, and a printer or plotter 15. Computer system 30 may be implemented utilizing any commercially available computer system which has been suitably programmed. Computer system 30 is capable of receiving a variety of different types of inputs from a variety of different types of input devices. Keyboard 14 and mouse 16 are two such types of input devices. In addition, computer system 30 is also capable of receiving inputs from a touch pad, such as touch pad 32.

Touch pad 32 includes a surface 34 for receiving inputs and providing outputs. Touch pad 32 also includes an audio output device, such as speaker 36 for providing audio outputs. Touch pad 32 includes a wheel 38 for "zooming in" or "zooming out", i.e. dynamically altering the portion of the interface to which the I/O device is calibrated to represent.

Figure 2:
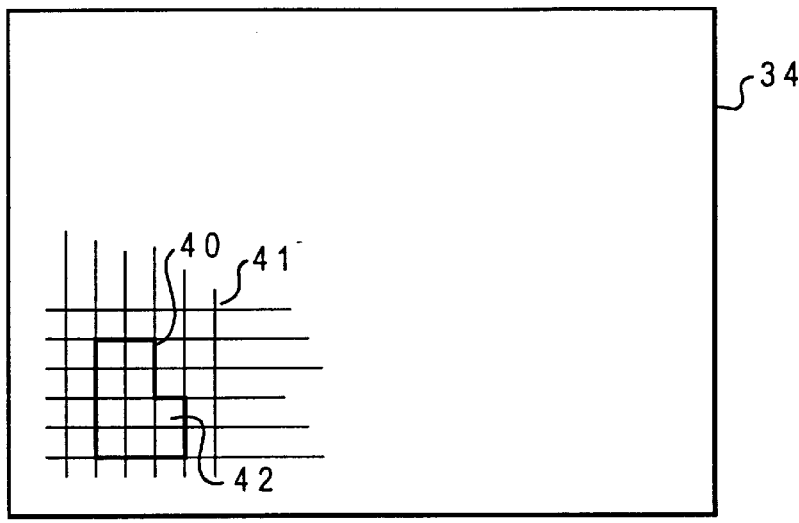
FIG. 2 depicts a pictorial representation of a surface of an I/O touch pad including an input region comprised of a plurality of addressable units of the surface in accordance with the method and system of the present invention.

FIG. 2 depicts a pictorial representation of a surface 34 of I/O touch pad 32 including an input region 40 comprised of a plurality of addressable units of surface 34 in accordance with the method and system of the present invention. Surface 34 of touch pad 32 includes a plurality of addressable units 41. An addressable unit is the smallest element within surface 34 capable of being addressed. Input region 40 includes a plurality of addressable units, such as addressable unit 42. A location indicator also includes at least one, and probably many, addressable units.

Figure 3:
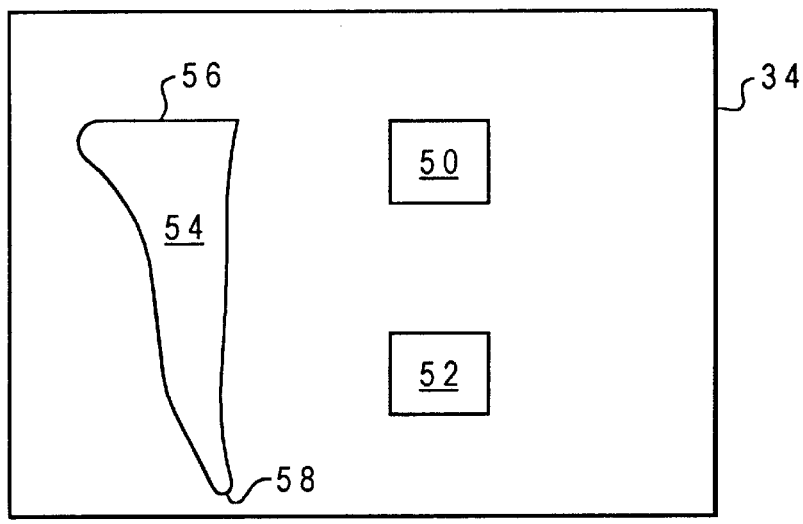
FIG. 3 illustrates a pictorial representation of an output provided utilizing a surface of a touch pad including three location indicators associated with three input regions in accordance with the method and system of the present invention.

FIG. 3 illustrates a pictorial representation of an output provided utilizing a surface of a touch pad including three location indicators associated with three input regions in accordance with the method and system of the present invention. As one example of an implementation of the present invention, surface 34 of touch pad may be utilized as an input device into a compact disk player. The compact disk player may receive as inputs an "OFF" signal input utilizing an "OFF" input region 50, an "ON" signal input utilizing an "ON" input region 52, and a volume signal input utilizing a volume region 54 utilized to increase or decrease the current volume of the output of the compact disk player. In the depicted example, the input region is the same size, shape, and in the same location as its corresponding location indicators. Therefore, regions 50, 52, and 54 are coincident to their associated location indicators. The location indicators may be visually lit areas and/or thermal areas. For example, the location indicator coincident to region 54 may be hotter at a top 56 of region 54 and colder at a bottom 58 of region 54.

Figure 4:
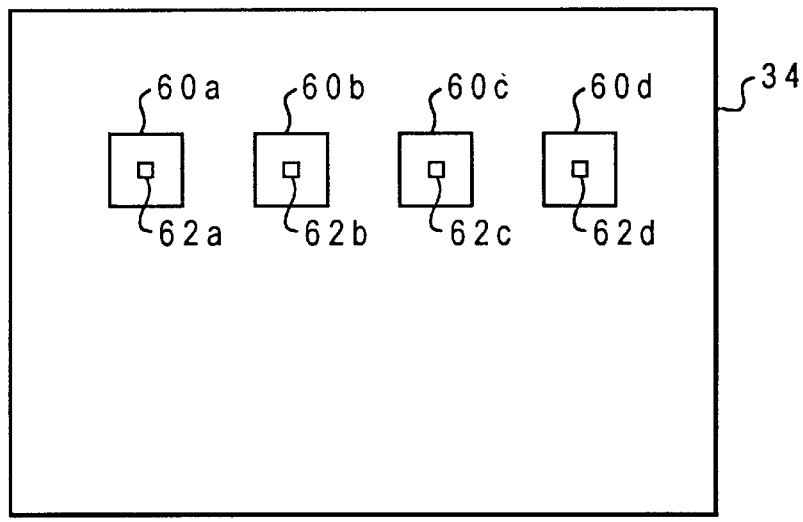
FIG. 4 illustrates a pictorial representation of an output generated in response to a selection of an input region depicted in FIG. 3 including four location indicators associated with four input regions provided utilizing a surface of a touch pad in accordance with the method and system of the present invention.

FIG. 4 illustrates a pictorial representation of an output generated in response to a selection of an input region depicted in FIG. 3 including four location indicators associated with four input regions provided utilizing a surface of a touch pad in accordance with the method and system of the present invention. In response to a selection of an input region depicted in FIG. 3, such as "ON" region 52, a plurality of input regions 60a–d are specified. Input regions 60a–d may be utilized, for example, as particular track selectors. For example, input region 60a may be associated with a particular compact disk track used to quickly access the particular track, while input regions 60b, 60c, and 60d are used to access other tracks.

FIG. 4 illustrates four input regions and four location indicators utilized to assist a user to quickly locate these input regions. FIG. 4 depicts an input region 60a and its associated location indicator 62a. Location indicator 62a is provided which is utilized to assist a user to locate input region 60a. An input region 60b and its associated location indicator 62b are depicted. Location indicator 62b is provided which is utilized to assist a user to locate input region 60b. An input region 60c and its associated location indicator 62c are depicted. Location indicator 62c is provided which is utilized to assist a user to locate input region 60c. And, an input region 60d and its associated location indicator 62d are depicted. Location indicator 62d is provided which is utilized to assist a user to locate input region 60d.

As illustrated by FIG. 4, a location indicator does not necessarily coincide exactly with the shape, size, or location of its associated input region. The input region may be of any shape capable of being generated utilizing a plurality of addressable units. Also, a location indicator may be of any shape capable of being generated utilizing a plurality of addressable units.

Surface 34 is first enabled to receive inputs utilizing the input regions depicted in FIG. 3. When one of the input regions of FIG. 3 is selected, surface 34 is becomes enabled to receive inputs utilizing the input regions depicted in FIG. 4.

When a user utilizes input region 52, the input regions specified within surface 34 change from those shown in FIG. 3 to those shown in FIG. 4. In response to the specified input regions changing, the location indicators provided utilizing the surface will also dynamically change from those depicted coincident to the input regions of FIG. 3 to location indicators 62a–d. Therefore, the output provided by surface 34 will change from location indicators depicted coincident to regions 50, 52, and 54 to location indicators depicted in FIG. 4.

Figure 5:
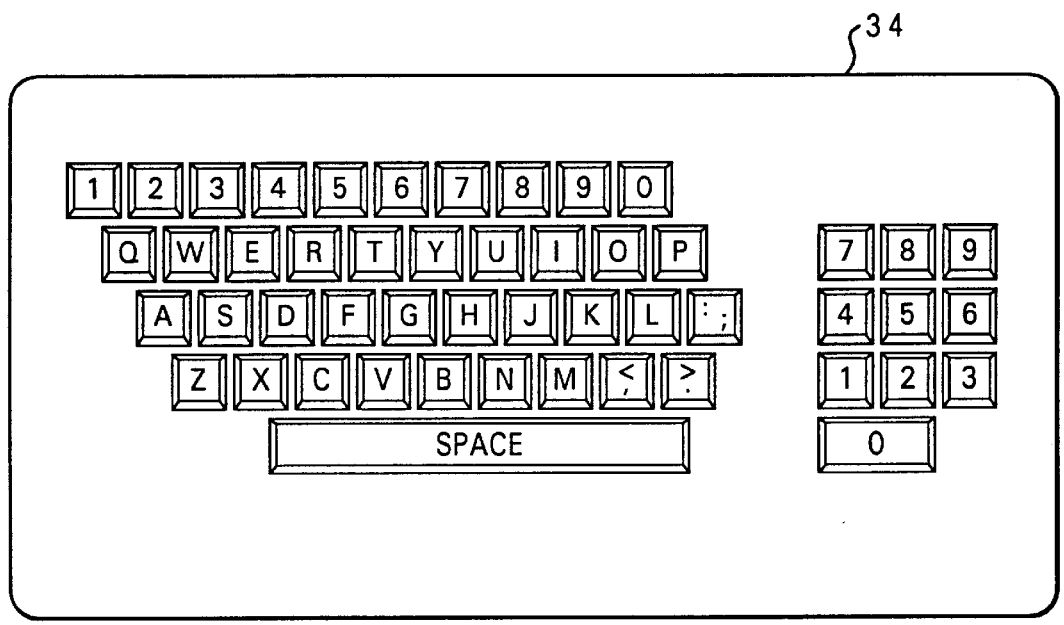
FIG. 5 illustrates a pictorial representation of a plurality of input regions associated with a plurality of location indicators associated with a keyboard mode of operation in accordance with the method and system of the present invention.

FIG. 5 illustrates a pictorial representation of a plurality of input regions associated with a plurality of location indicators associated with a keyboard mode of operation in accordance with the method and system of the present invention. Surface 34 may be enabled in a keyboard mode where a plurality of location indicators are utilized configured as a keyboard where associated input regions are defined on surface 34 to correspond to keyboard entries. Surface 34 may also be utilized in a piano keyboard mode, or any other such mode.

For example, in a keyboard mode, a plurality of input regions may be illuminated utilizing a different location indicator for each letter. An audio output may be provided for indicating which key a user is selecting. When a user places his or her finger over a particular key, a voice output of a specific timbre and gender may provide an audio feedback saying the name of the key. Location of the user's finger could be implemented using one of a plurality of currently available touch screen/locator technologies. For example, a pressure sensitive device which detects varying amounts of pressure could be utilized, where a lighter pressure results in one action while a heavier pressure results in a different action. If a user presses the particular key, a different voice provides feedback that the user has input that particular key.

Figure 6:
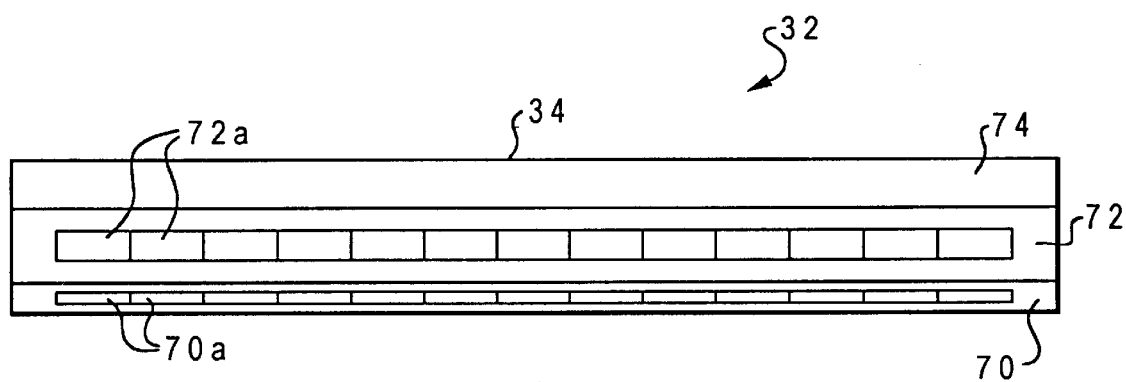
FIG. 6 depicts a cross-sectional view of an input/output touch pad in accordance with the method and system of the present invention.

FIG. 6 depicts a cross-sectional view of an input/output touch pad 32 in accordance with the method and system of the present invention. Touch pad 32 includes a tactile output layer 70 and a visual output layer 72. Tactile output layer 70 is preferably a matrix of a plurality of heat-emitting material elements 70a, where each element 70a of the matrix is one, single addressable unit. Visual output layer 72 is preferably a matrix of a plurality of light-emitting material elements 72a, where each element 72a of the matrix is one, single addressable unit. Each element of matrix of layer 72 is coincident with and overlies each element of matrix of layer 70 such that each element of layer 70 is superimposed on top of each element of layer 72. Each heat-emitting element is preferably implemented using "Peltier waffles" which utilizes reversible electromagnetic thermodynamics. Although this technology is well known, it has not previously been applied to this purpose. Each light-emitting element is preferably implemented utilizing a light emitting diode (LED).

Layer 74 is a semi-translucent layer which provides a protective cover for the underlying layers. Layer 74 is a thin film or membrane that protects the innards of the device and provides a cleanable surface.

Figure 7:
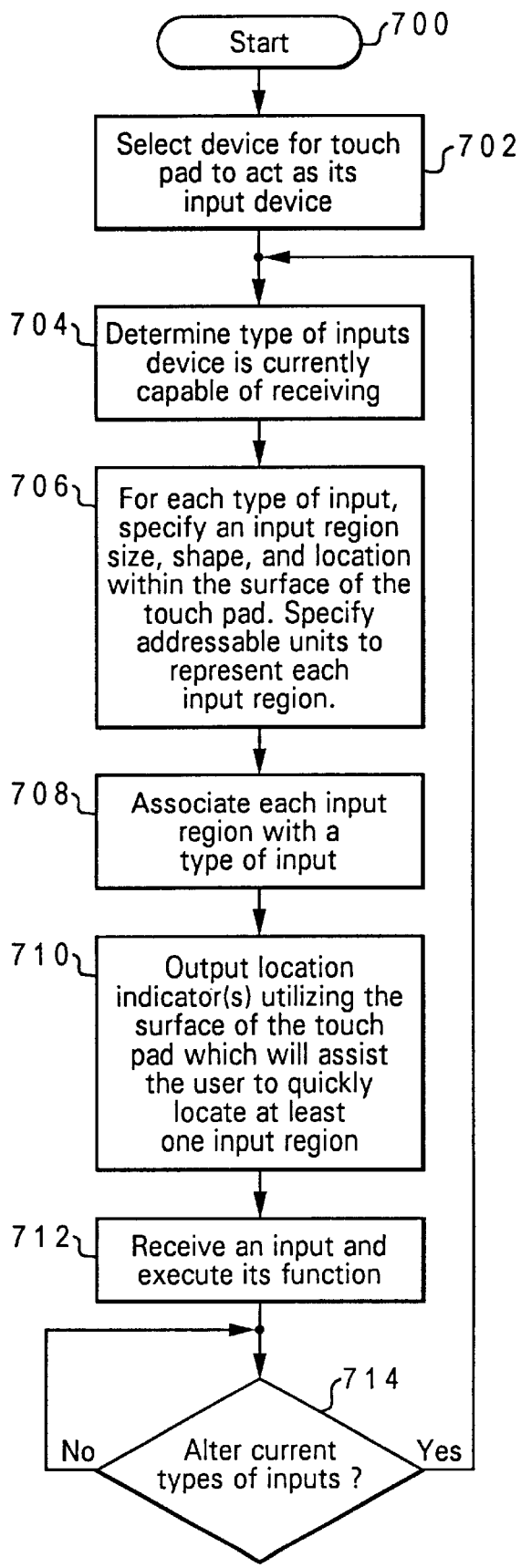
FIG. 7 illustrates a high level flow chart which depicts dynamically altering location indicators in response to an alteration of input regions included within a surface of an I/O touch pad in accordance with the method and system of the present invention.

FIG. 7 illustrates a high level flow chart which depicts dynamically altering location indicators in response to an alteration of input regions included within a surface of an I/O touch pad in accordance with the method and system of the present invention. The process starts as depicts at block 700 and thereafter passes to block 702 which illustrates a selection of a device for a touch pad to act as its input device. For example, the touch pad may be an input device for a computer system, a compact disk player, an automobile air conditioning system, or any other device capable of receiving inputs. Next, block 704 depicts a determination of types of inputs the selected device is currently capable of receiving. For example, a computer system may be currently displaying several windows, one of these windows being the active window. The active window may include a plurality of types of inputs such as a "close window" region, and an active input region where a cursor is currently located. As another example, a compact disk player may currently be capable of receiving a volume input, or a track selection input.

The process then passes to block 706 which illustrates a specification of an input region for each current type of input the device associated with the touch pad is capable of receiving. A size, shape, and location are specified for the input region within the surface of the touch pad. The surface of the touch pad includes a plurality of addressable units. An addressable unit is the smallest element capable of being addressed by the touch pad. In the preferred embodiment, each addressable unit is one of a plurality of LED's arranged in a matrix, one of a plurality of thermal elements arranged in a matrix, or a combination of one of a plurality of LED's with one of a plurality of thermal elements. Prior to the specification of the input region, the addressable units are unrelated to any particular type of input. Each input region is specified by specifying a plurality of addressable units which are then associated with each input region.

Thereafter, block 708 depicts associating each input with a type of input. For example, one input region may be associated with a volume control input into a compact disk player. Next, block 710 illustrates the touch pad outputting location indicators utilizing the surface of the touch pad. The location indicators will assist the user to quickly locate at least one of the input regions. The process then passes to block 712 which depicts receiving and executing an input. Thereafter, block 714 illustrates a determination of whether or not the current inputs the device is capable of receiving have been altered. If the current inputs the device is capable of receiving have been altered, the location indicators must also be altered synchronously with the alteration of the current types of inputs in order to assist a user in quickly locating the input regions now specified within the surface. Therefore, if the current types of inputs have not been altered, the process passes back to block 714 until the current types of inputs have been altered. When the current types of inputs have been altered, the process passes to block 704.

While a preferred embodiment has been particularly shown and described, it will be understood by those skilled in the art that various changes in form and detail may be made therein without departing from the spirit and scope of the present invention.

What is claimed is:

1. An input/output (I/O) touch pad for receiving user inputs and generating dynamically alterable visual and tactile location indicators, said I/O touch pad comprising:
   an interactive surface including a plurality of addressable unit locations that are selectively enabled to form location indicators for assisting a user to locate corresponding input regions on said interactive surface, said interactive surface comprising:
   a visual output layer including a matrix of individually addressable visual output elements, wherein each of said individually addressable visual output elements is situated at one of said plurality of addressable unit locations; and
   a tactile output layer including a matrix of individually addressable tactile output elements, wherein each of said individually addressable visual output elements is situated at one of said plurality of addressable unit locations such that each of said tactile output elements is co-located with a corresponding one of said plurality of visual output elements within each of said plurality of addressable unit locations, and wherein each of said tactile output elements is a heating element situated beneath its corresponding visual output element.

2. The I/O touch pad of claim 1, wherein said interactive surface is covered by a semi-translucent layer that provides a protective cover for said visual output layer and said tactile output layer.

3. The I/O touch pad of claim 1, wherein said individually addressable visual output elements are light-emitting devices.

4. The I/O touch pad of claim 3, wherein said light-emitting devices are light-emitting diode devices.

5. The I/O touch pad of claim 1, wherein said heating elements are Peltier waffle devices that utilize reverse electromagnetic thermodynamics.

6. A method for providing an input/output (I/O) touch pad for receiving user inputs and generating dynamically alterable visual and tactile location indicators, said method comprising:

providing an interactive surface including a plurality of addressable unit locations that are selectively enabled to form location indicators for assisting a user to locate corresponding input regions on said interactive surface;

providing within said interactive surface, a visual output layer including a matrix of individually addressable visual output elements, wherein each of said individually addressable visual output elements is situated at one of said plurality of addressable unit locations; and providing within said interactive surface, a tactile output layer including a matrix of individually addressable tactile output elements, wherein each of said individually addressable visual output elements is situated at one of said plurality of addressable unit locations such that each of said tactile output elements is co-located with a corresponding one of said plurality of visual output elements within each of said plurality of addressable unit locations, and wherein each of said tactile output elements is a heating element situated beneath its corresponding visual output element.

7. The method of claim 6, wherein said individually addressable visual output elements are light-emitting devices.

8. The I/O touch pad of claim 7, wherein said light-emitting devices are light-emitting diode devices.

9. The I/O touch pad of claim 6, wherein said heating elements are Peltier waffle devices that utilize reverse electromagnetic thermodynamics.

* * * * *